United States Patent [19]
Pereira

[11] Patent Number: 4,778,700
[45] Date of Patent: Oct. 18, 1988

[54] FIBER GLASS PRODUCT

[75] Inventor: Jon W. Pereira, Franklin, Ind.

[73] Assignee: Knauf Fiber Glass GmbH, Shelbyville, Ind.

[21] Appl. No.: 876,593

[22] Filed: Jun. 20, 1986

[51] Int. Cl.⁴ ............................ B32B 7/06; B32B 7/12
[52] U.S. Cl. ......................................... 428/40; 428/57; 428/194; 428/36; 138/151; 138/167; 138/DIG. 1
[58] Field of Search ................... 428/36, 40, 57, 194; 138/149, 151, DIG. 1, 167

[56] References Cited
U.S. PATENT DOCUMENTS
4,022,248  5/1977  Hepner et al. ............... 138/151 X Primary Examiner—Alexander S. Thomas
Attorney, Agent, or Firm—James G. Staples

[57] ABSTRACT

This invention relates to a pipe insulation product which, as contrasted to presently available commercial products, eliminates fishmouthing of the protective liner from the insulation blanket, eliminates cutting the liner at the job, always a difficult task, is extremely easy to manufacture, ship and handle, and is very easy to use in the field, even under adverse working conditions such as high winds.

4 Claims, 4 Drawing Sheets

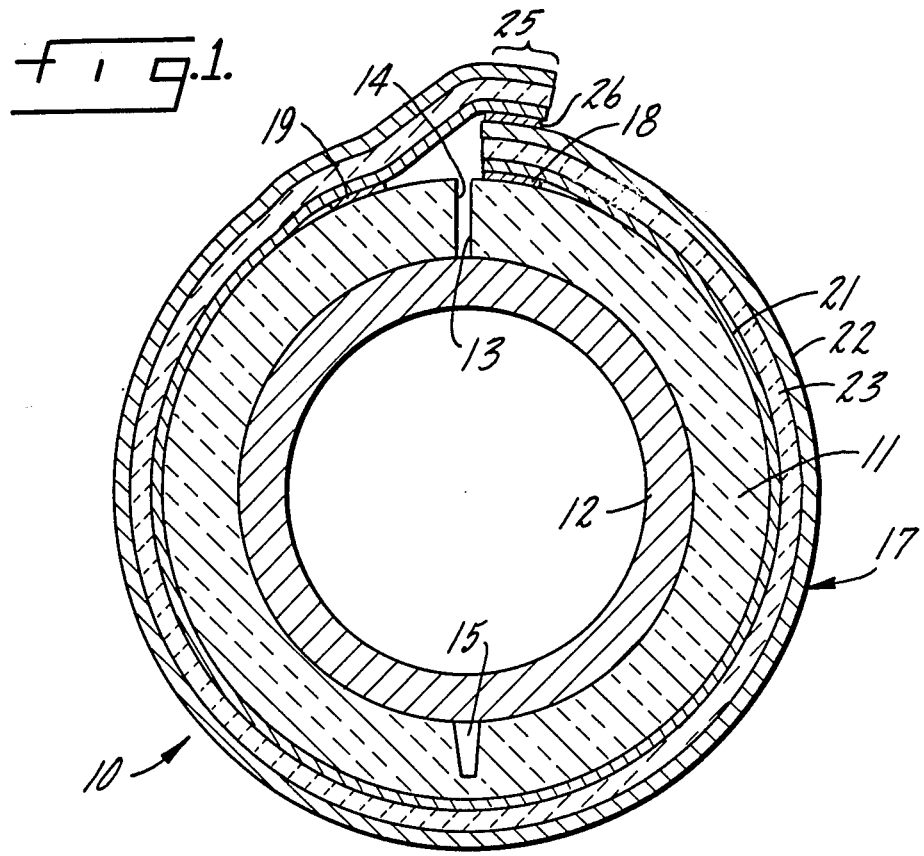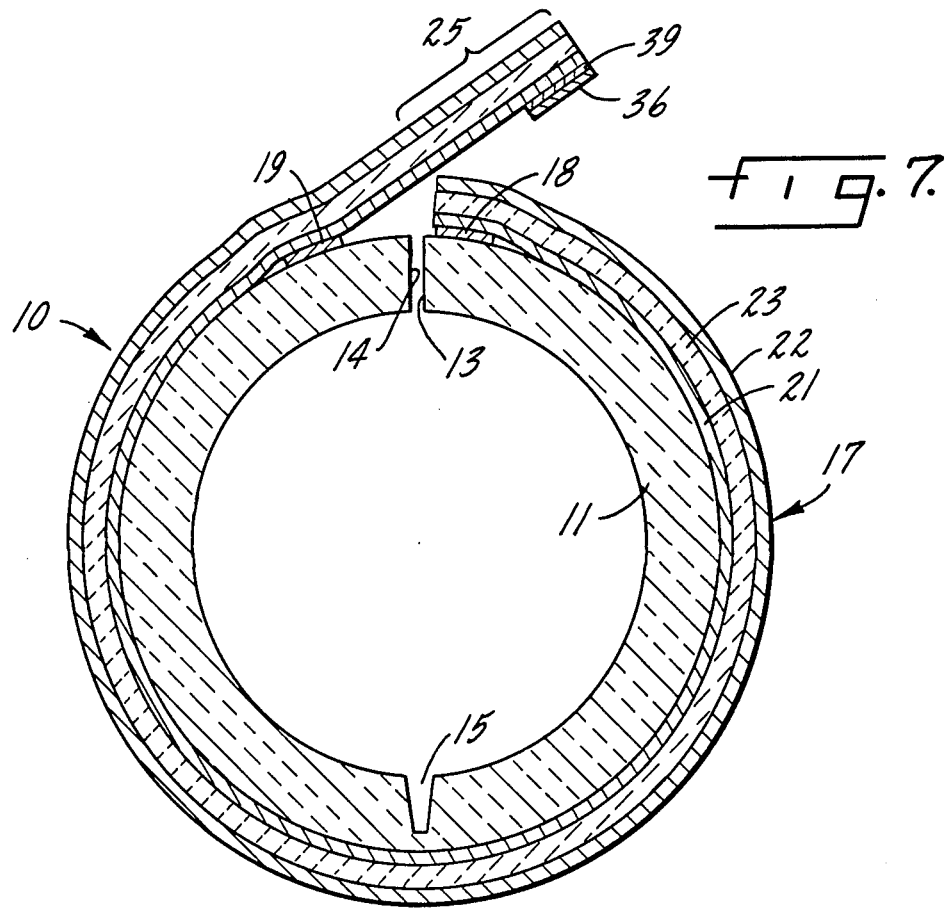

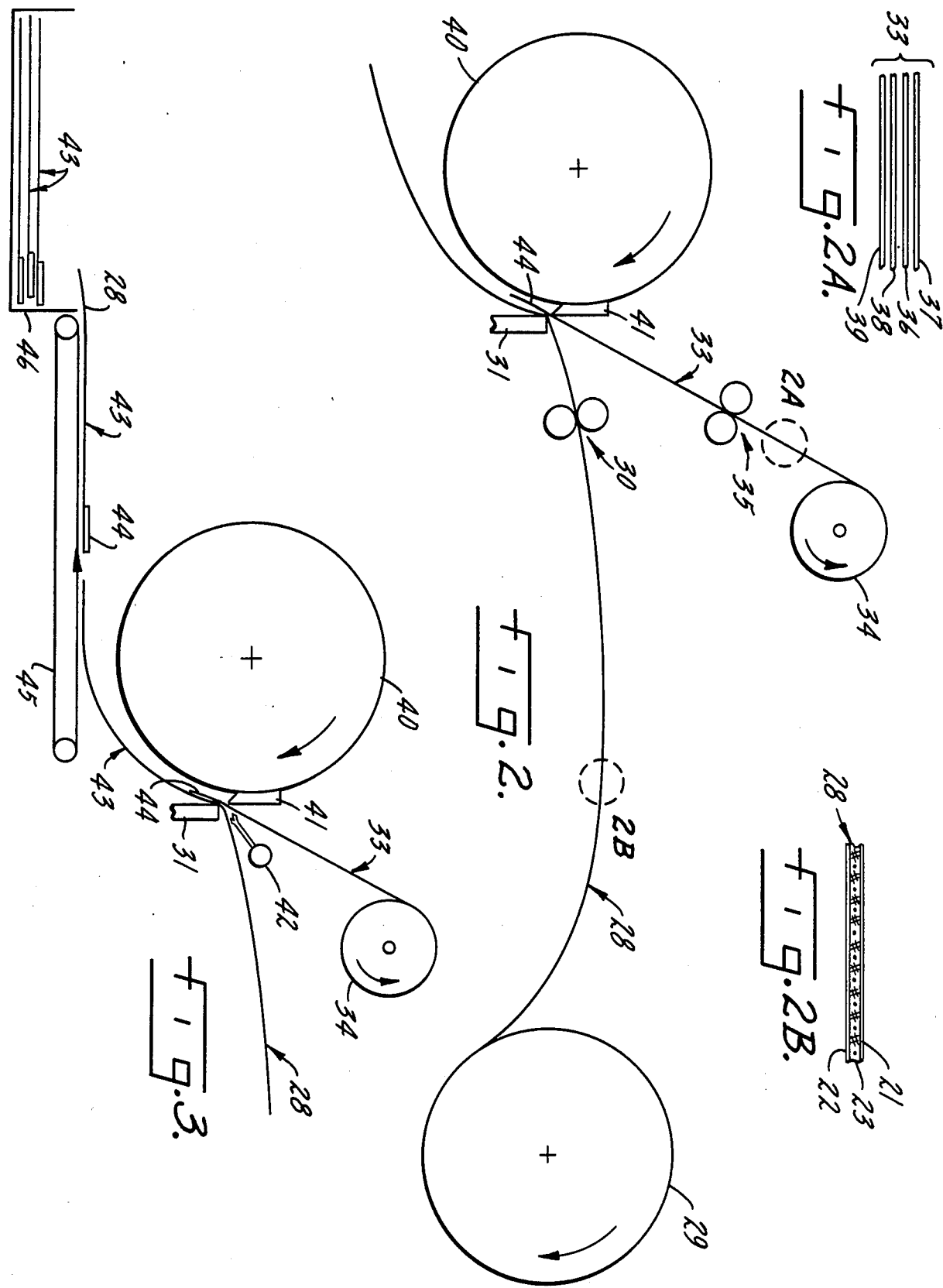

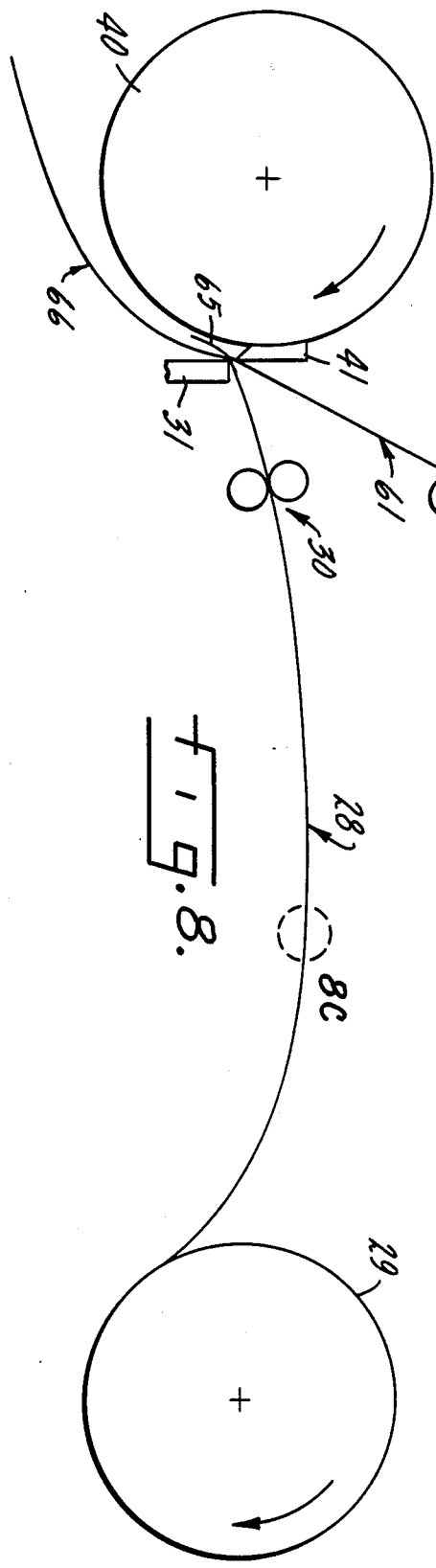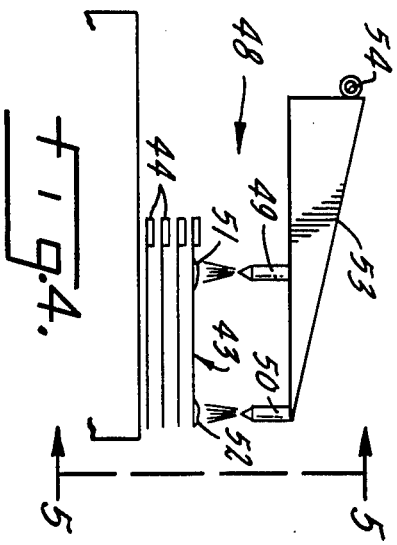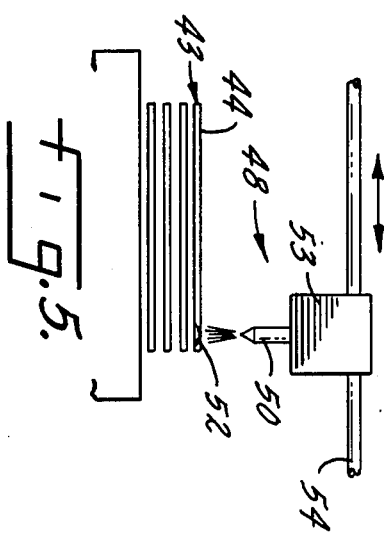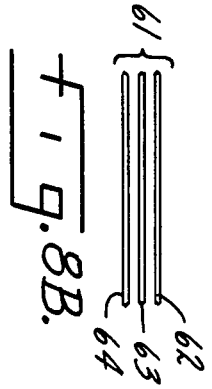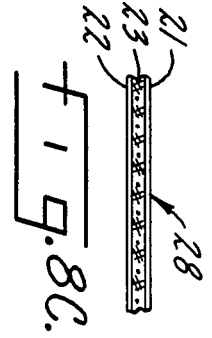

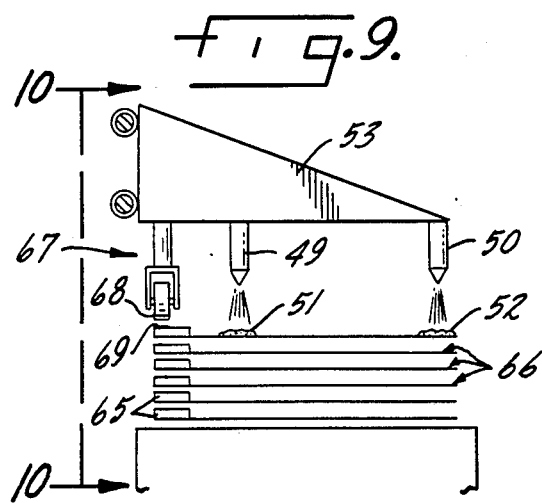
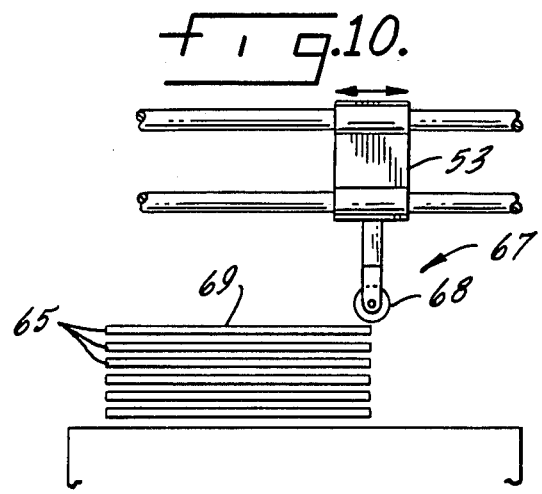
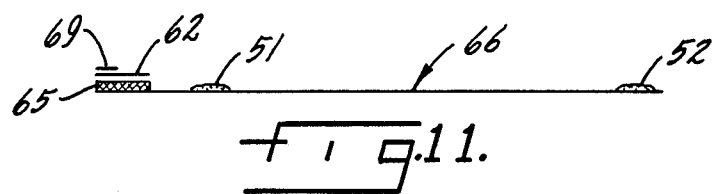
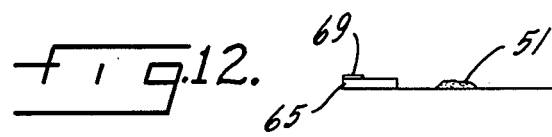
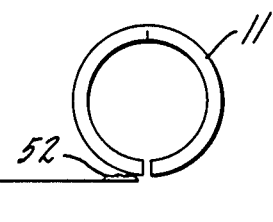
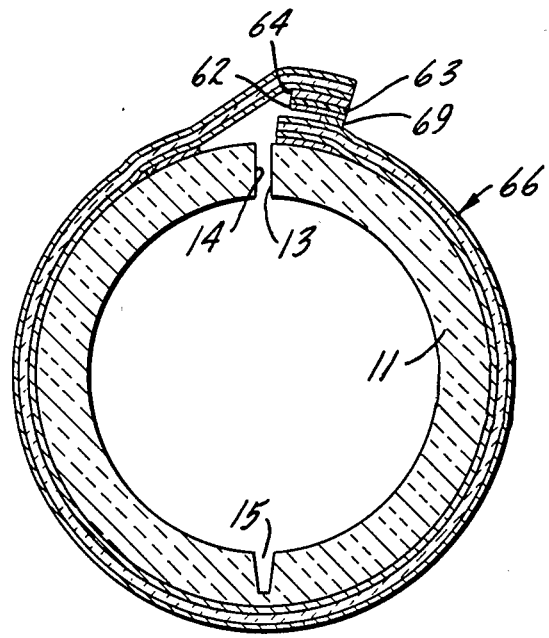
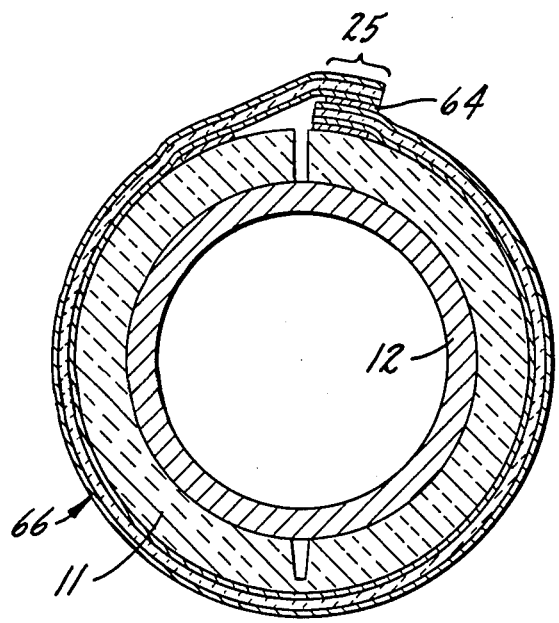

4,778,700

FIBER GLASS PRODUCT

This invention relates to a pipe insulation produce which, as contrasted to presently available commercial products, eliminates fishmounting of the protective liner from the insulation blanket, eliminates cutting the liner at the job, always a difficult task, is extremely easy to manufacture, ship and handle, and is very easy to use in the field, even under adverse working conditions such as high winds. In addition the invention relates to a method of manufacturing such a product and a method of manufacturing a section of insulated pipe as would hold true, for example, in field operations at a job site.

BACKGROUND OF THE INVENTION

Pipe insulation products currently commercially available provide good insulation for pipes and other thermal equipment once installed, but difficulties are encountered in shipping, handling and using such products in the field. Fishmouthing, which is a condition in which the protective wrap separates from the blanket of insulating material, usually fiberglass, due to normal shipping and handling stresses, is a recurrent problem. Installers have also complained that the protective wrap tends to separate from the insulation blanket in the field, particularly in locations where installation conditions are difficult and/or when high winds are encountered. These difficulties stem from the tendency of the protective wrap to separate from the blanket. And of course there is the frequent problem of having to tape the ends of the protective wrap at the meeting edges of the blanket and its associated protective wrap.

Accordingly it is the object of this invention to overcome the problems described above.

BRIEF DESCRIPTION OF THE INVENTION

The pipe insulation product of this invention consists of a conventional blanket of insulation to which is adhered, at either side of the longitudinally butted ends, a protective liner, with an end of the liner extending peripherally beyond the butted ends to form an overlay. In one form of the invention the overlay comprises a strip of adhesive in the overlap area, which strip is protected by an overlying strip of kraft paper whereby, after installation on a pipe, the kraft paper can be peeled away exposing the adhesive, and the free end of the liner then adhered in overlapping relation to the already adhered liner on the blanket. In an alternative embodiment the exposed end of the protective liner which forms the overlap strip is temporarily adhered at the factory to the already adhered liner so that the insulating product may be shipped and handled up to the moment of field installation without any loose ends which could start fishmouthing or product deterioration. At the moment of field installation the temporary adhesive is broken, a strip of protective kraft paper peeled away, and the liner secured to itself via strip of adhesive which was protected up to that moment by the peeled away kraft paper.

BRIEF DESCRIPTION OF THE DRAWINGS

The invention is illustrated more or less diagrammatically in the accompanying drawing wherein:

FIG. 1 is a section view with parts enlarged for clarity of a first embodiment of the invention which includes a protective liner as it would appear in an installed condition;

FIG. 2 is a diagrammatic representation of the first stage of manufacture of the protective liner illustrated in FIG. 1;

FIG. 2A is an expanded view of the liner material indicated at 2A in FIG. 2;

FIG. 2B is an expanded view of the liner material indicated at 2B in FIG. 2;

FIG. 3 is a schematic view of a subsequent portion of the manufacturing process of the embodiment of FIG. 1;

FIG. 4 is a diagrammatic view of a still further processing step in the manufacture of the embodiment of FIG. 1;

FIG. 5 is a view taken substantially along the line 5—5 of FIG. 4;

FIG. 6 is a schematic view illustrating assembly of a protective liner to an insulating blanket;

FIG. 7 is a section view with parts enlarged of the pipe insulation product of FIGS. 1-6 as shown in its condition after completion of manufacture and just prior to use in the field;

FIG. 8 is a diagrammatic representation of a manufacturing process of a second embodiment of the invention;

FIG. 8A is a view to an enlarged scale of the web material indicated at 8A in FIG. 8;

FIG. 8B is a view to an enlarged scale of the web material indicated at 8B in FIG. 8;

FIG. 8C is a cross-sectional view to an enlarged scale of the web material indicated at 8C in FIG. 8;

FIG. 9 is a diagrammatic view of a subsequent step in the manufacturing process of the second embodiment;

FIG. 10 is a view taken substantially along the line 10—10 of FIG. 9;

FIG. 11 is a view of a protective liner following application of the temporary adhesive;

FIG. 12 is a view illustrating securement of the protective liner to an insulating blanket;

FIG. 13 is a cross-section view with parts enlarged for clarity of the pipe insulation product of the second embodiment in its condition immediately following manufacture and up to the moment of installation in the field; and FIG. 14 is a cross-section of the second embodiment with parts enlarged for clarity illustrating the final assembled product.

Like reference numerals will be used to refer to like parts throughout the following description of the drawing.

DETAILED DESCRIPTION OF THE INVENTION

Referring first to the embodiment of FIGS. 1 through 7, the pipe insulation product in its condition as installed on a pipe is indicated at 10 in FIG. 1. The pipe insulation product consists of an insulation blanket 11 which has an internal diameter capable of being received in snug fitting relationship around the external diameter of a pipe 12 to be insulated. It will be noted that the insulation blanket includes two edges 13, 14 which extend the length of the insulation blanket section and face one another in abutting relationship. A typical longitudinal or axial length of the insulation blanket is three feet. As will be noted from FIGS. 1 and 7 the insulation blanket is cut approximately three-quarters of its radial distance through at a location is directly opposite the longitudinal slit which forms the butted edges 13 and 14, so as to form a hinge which facilitates assembly of the pipe insulation product over pipe 12 during the field manufacture of a field insulated pipe section.

A protective liner, indicated generally at 17, surrounds the insulation blanket 11 and is secured to it at at least two locations. In this instance the protective liner is secured by a longitudinal strip of adhesive 18 located near the edge of the protective liner 17 and near the butt edge 13 of the installation blanket, and a second longitudinal strip of adhesive 19 which is located near butt edge 14. As will be noted, longitudinal strip 19 of adhesive is located peripherally almost 360 degrees from the first strip 18, as viewed in a clockwise direction, and between the end edges of the protective liner 17.

The protective liner includes a metal foil 21 which may be formed of any suitable material, such as aluminum of a suitable thickness. A thickness of 0.005 inches is commonly used in the art.

The outer layer 22 of the protective liner is formed from kraft paper. Laminated between the metal foil 21 and kraft paper 22 is an intermediate layer 23 consisting of a glass scrim and an adhesive.

It will be noted that the protective liner 17 overlaps itself in the region indicated generally at 25. The overlap section 25 is secured by a longitudinal strip of adhesive 26 which adheres the inner surface of the metal foil 21 to the outer surface of kraft paper 22.

The method of manufacturing the pipe insulation product 10 is illustrated best in FIGS. 2 through 6.

In FIG. 2, a facing 28, consisting of kraft paper 22, an intermediate layer consisting of scrim and adhesive 23, and a metal foil 21 are peeled off a facing roll 29. The facing passes between drive roller set 30 to an anvil 31.

At the same time an adhesive strip 33 is unpeeled from an adhesive roll 34 and passed between drive roller set 35 from which it passes to the region of the anvil 31. The adhesive strip 33 consists of a layer of kraft paper 36, two layers of silicone release material 37, 38, and a layer of adhesive 39. It will be noted that the adhesive layer 39 moves toward contact with foil 21 in the region of the anvil.

A cutter roll is indicated at 40, the cutter roll carrying a blade 41 which cuts through the adhered adhesive strip 33 and facing 28 by engagement with the anvil 31.

In FIG. 3 it will be noted that an air header 42 is employed to prevent premature contact of adhesive strip 33 with facing 28. After separation is made via the cutting action of blade 41, a plurality of facing sheets 43 have been formed, each facing sheet consisting of the facing material 28 to which a short section of the adhesive strip 33, indicated at 44, has been adhered. A run off belt 45 delivers the facing strips 43 to a collecting tray 46.

The collected facing strips 43 are then moved to a spray station 48 shown in FIGS. 4 and 5 where chlorinated solvent adhesive is sprayed from nozzles 49, 50 onto the facing strips in two locations to form strips of adhesive 51, 52, the edge of strip 52 being shown in FIG. 5. It will be noted that the chlorinated solvent adhesive is delivered from a header 53 which reciprocates in the direction of the arrow of FIG. 5 along guide rail 54.

The facing strips 43 which now contain adhesive strips 51, 52, are moved from spray station 48 to adhering station 55 of FIG. 6 at which the leading edge of insulation blanket 11 is brought into contact with adhesive strip 52, and the blanket rolled onto facing strip 43 so as to secure the protective liner 17 at two locations, one on each side of the slit which forms abutting edges 13 and 14, to insulation blanket 11.

The final product as it leaves the factory packed in boxes or cartons is illustrated in FIG. 7 with the free end of facing strip 43 carrying adhesive ribbon 44 which is protected by kraft paper 36.

In use, the field installer removes the pipe insulation product 10 in its form as illustrated in FIG. 7 from the box or carton in which it was shipped to the job site, and slips the insulation product over a pipe 12 which passes between the abutting edges 13 and 14 by virtue of the hinge action provided by the slit or cut through 15. Up to this moment in time the adhesive 39 remains protected by kraft paper 36.

After the pipe insulation product has been slipped over pipe 12, the field installer peels away kraft paper 36 and presses the overlap portion 25 of protective liner 17 down onto the outer layer 22 of the already secured portion of the protective liner 17 to the right of the abutting edges 13 and 14 which results in the final manufactured insulated pipe product of FIG. 1.

In the embodiment of FIGS. 8 through 14, a double kraft paper system is disclosed which includes a double kraft paper roll 57 from which a first layer of kraft paper, indicated at 58 with a silicone coating at 59, is peeled and wrapped around waste roll 60, and a second facing layer 61 extends. As best illustrated in FIG. 8B, the second facing layer consists of a layer of kraft paper 62, a silicone coating 63 and an adhesive layer 64.

After blade 41 severs a ribbon 65 from the adhesive strip 61 an alternate facing strip 66 is formed. The alternate facing strip 66 is then transferred to a hot melt adhesive station 67 of FIG. 9 where a hot melt adhesive applicator 68 applies hot melt adhesive to the far left edge of the alternate facing strip 66. The placement of the hot melt adhesive forms, in effect, a temporary closure system, often referred to as a self-seal lap or SSL 69. The self-seal lap 69 is illustrated in side view in FIG. 10.

The final product is shown in expanded cross-section in FIG. 11 where the hot melt adhesive 69 is seen to be resting on, in this instance, a portion of kraft paper 62.

In FIG. 12 the alternate facing strip 66 is shown in the step of being adhered to insulating blanket 11. The final product in its form following completion of the adherring step illustrated in FIG. 12 is shown in FIG. 13 where it will be noted that the hot melt adhesive 69 and kraft paper 62 and silicon coating 63 form part of the product, as manufactured at the factory, which is placed in containers for shipment to the job site.

At the job site the installer merely breaks the temporary seal formed by the hot melt adhesive 69 by a manual lifting operating, installs the insulation blanket 11 onto the pipe 12 and then peels away hot melted adhesive 69 and kraft paper 62 to expose adhesive 64 by which the overlap section 25 is adhered to the already secured portion of the insulation blanket 11.

One further advantage of the embodiment of FIG. 12 is that there is no possibility of undesired separation between the protective liner and the insulation blanket due to rough handling between completion of manufacture at the factory and installation at the job site.

Although a preferred and alternative embodiment of the invention has been illustrated and described, it will be apparent to those skilled in the art that modifications may be made within the spirit and scope of the disclosure herein. Accordingly it is intended that the scope of the invention be limited not by the foregoing exemplary description but solely by the scope of the hereinafter appended claims when interpreted in light of the relevant prior art.

I claim:

1. A blanket of pipe insulation capable of surrounding a pipe in combination with a means forming a protective wrap secured to the outside surface of said blanket, said combination comprising, a blanket of pipe insulation having edges which face each other along a path which extends in a direction generally parallel to the axis of a pipe when said blanket surrounds said pipe, means for assembling said blanket of pipe insulation to a pipe in a generally radial direction, a protective wrap means for the outside surface of said blanket including a flexible sheet means having two edges which extend around the periphery of the blanket a distance equal to the circumference of the blanket plus an overlap, first means for securing one end of the flexible sheet means to the blanket in a region near one of the edges of the blanket, second means for securing the flexible sheet means to the blanket in a location peripherally spaced from the first securing means, and overlap securement means carried by the overlap portion of the flexible sheet means at the other end thereof for securing the flexible sheet means to itself, said overlap securement means including adhesive on the inner side of said flexible sheet means near said other end thereof, a removable protective member overlying said adhesive which, when removed just prior to final assembly, exposes said adhesive on the overlap portion of the flexible sheet means, whereby, when said overlap portion of said flexible sheet means which carries said exposed adhesive is brought into contact with the overlapped portion of the flexible sheet means, said flexible sheet means is permanently secured to itself, and temporary closure means carried by the removable protective member on the face opposite the face of the removable protective member in contact with the adhesive, said temporary closure means being effective to secure the protective wrap to itself until removal of the removable protective member just prior to permanent securement of the flexible sheet means to itself.

2. The pipe insulation product of claim 1 further characterized by and including temporary closure means carried by the removable protective member on the face opposite the face of the removal protective member in contact with the adhesive, said temporary closure means being effective to secure the protective wrap to itself until removal of the removable protective member just prior to permanent securement of the flexible sheet means to itself.

3. The pipe insulation produce of claim 1 further characterized in that said temporary closure means is an adhesive.

4. The pipe insulation product of claim 3 wherein said means for assembling said blanket of pipe insulation to a pipe in a generally radial direction being further characterized by and including a partial slit in said blanket.

* * * * *